Jan. 10, 1967 B. D. LOUGHLIN 3,297,821
CONTRAST CONTROL APPARATUS FOR CONTROLLING THE VIDEO SIGNAL OF A TELEVISION RECEIVER
Filed July 2, 1963
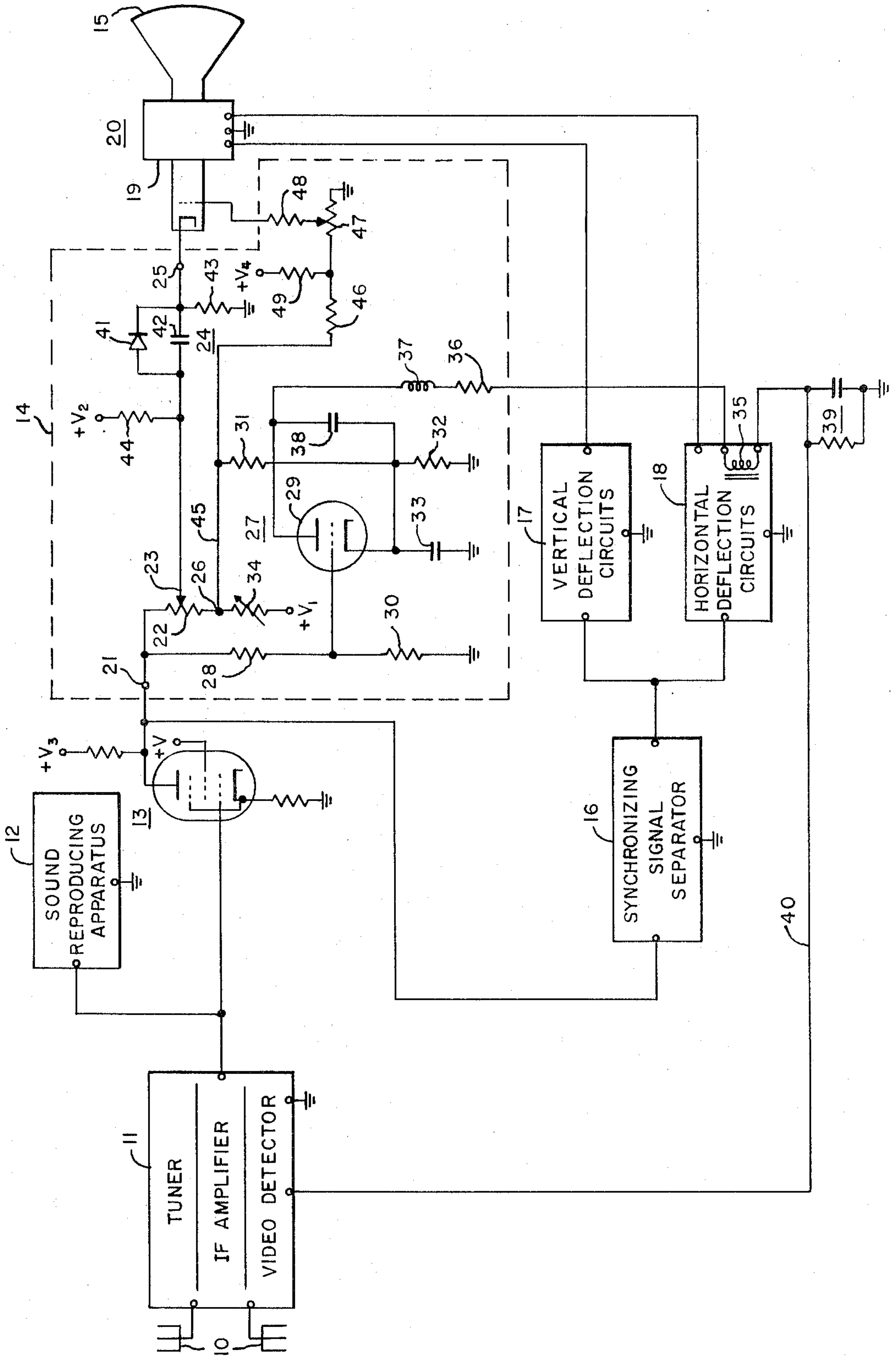

United States Patent Office 3,297,821
Patented Jan. 10, 1967

3,297,821

CONTRAST CONTROL APPARATUS FOR CONTROLLING THE VIDEO SIGNAL OF A TELEVISION RECEIVER

Bernard D. Loughlin, Huntington, N.Y., assignor to Hazeltine Research, Inc., a corporation of Illinois Filed July 2, 1963, Ser. No. 292,246
5 Claims. (Cl. 178—7.5)

The present invention relates to apparatus for controlling the video signal of a television receiver and, more particularly, to such apparatus for improving the black level operation of a television receiver utilizing a contrast control located after the point stabilized by the automatic-gain-control (AGC) circuit.

One of the problems encountered by the engineer in designing a television receiver having an AGC circuit is having to decide where in the video signal path the contrast control should be located. If he decides to connect the contrast control before the point stabilized by the AGC circuit, such as in the screen grid or cathode circuit of the video amplifier, he finds that adjustment of the contrast control causes variations in the signal supplied to the synchronizing signal separator which may be sufficient to introduce beam deflection problems. If, instead he decides to connect the contrast control at the output of the video detector, but still before the point stabilized by the AGC circuit, he finds that the AGC circuit operates in such a direction as to defeat the purpose of the control and may, if the contrast control is turned down far enough, overload one of the receiver stages prior to the video amplifier. In either case, he finds that adjustment of the contrast control causes changes in AGC. However, if he decides on the other hand to connect the contrast control after the point stabilized by the AGC circuit, and if the AGC circuit is of the type which operates to stabilize the video signal black level in the picture tube, he finds that any adjustment of the contrast control may very well cause black to drift in the reproduced image, thereby upsetting the previously correct black level operation, the degree of upset being a function of the contrast control setting.

It is an object of the present invention, therefore, to provide apparatus for controlling the video signal of a television receiver having an AGC circuit of a type which operates to stabilize black in the reproduced image and a contrast control located after the point stabilized by the AGC circuit to minimize the undesirable black level drift that would otherwise result as the setting of the contrast control is adjusted.

It is another object of the present invention to provide such apparatus at a minimum of cost and circuit complexity.

Thus, in accordance with the present invention, there is provided apparatus for controlling the video signal of a television receiver having an image-reproducing device including first means for supplying a video signal having a level intended to correspond to black in the reproduced image. The apparatus also includes second means for supplying an adjustable reference potential and a contrast control means for adjusting the amplitude of the video signal, having a first terminal coupled to the first means, a second terminal coupled to the second means, and a third terminal adjustably coupled to the first and second terminals and coupled to the image-reproducing device. The apparatus further includes automatic control means coupled to the first and second terminals for stabilizing black level in the video signal supplied to the first terminal at the potential supplied to the second terminal for causing the video signal black level translated, via the third terminal, to the image-reproducing device to be stabilized at the second terminal potential independently of adjustments in the contrast of the translated signal.

For a better understanding of the present invention together with other and further objects thereof, reference is had to the following description taken in connection with the accompanying drawing, and its scope will be pointed out in the appended claims.

Referring to the drawing:

There is shown apparatus for controlling the video signal of a television receiver to improve the black level operation at the image-reproducing device thereof.

GENERAL

Referring to the drawing, there is shown a television receiver employing apparatus for controlling the video signal constructed in accordance with one form of the present invention, and hereinafter referred to simply as control apparatus. Thus, with the exception of the control apparatus and unless otherwise noted, the receiver may be of conventional construction. The receiver comprises, in part, antenna system 10 coupled to the input of unit 11 which includes the usual tuner, intermediate-frequency (IF) amplifier, and video detector from which are derived a sound-modulated intercarrier beat note component and a video signal component. The sound component is applied to sound reproducing apparatus 12 wherein it is amplified, detected and reproduced by the sound reproducing device.

The video signal component is D.-C. coupled, with sync pulses extending in a negative direction, from the video detector in unit 11 to the control grid of video amplifier 13 wherein it is amplified, reversed in polarity, and applied through control apparatus 14 to a cathode-ray type image-reproducing device or picture tube 15 in a manner to be subsequently described. The video signal developed by amplifier 13 is also applied to synchronizing signal separator 16 wherein the synchronizing pulses in the composite signal are stripped and applied to the vertical and horizontal circuits 17 and 18. Beam deflection signals are developed in these units in the usual manner and applied to the deflection yoke 19 of image-reproducing apparatus 20. As will become clear hereinafter, control apparatus 14, as embodied in the drawing, provides correct black level operation in the reproduced image regardless of the setting of the contrast control.

DESCRIPTION AND OPERATION OF CONTROL APPARATUS 14

Referring now more particularly to the control apparatus 14, the arrangement there represented includes means such as input terminal 21 for supplying a video signal having an average value which may vary from scene to scene, and having a level intended to correspond to black in the reproduced image.

Control apparatus 14 also includes means for translating the supplied video signal to the picture tube 15. Such means specifically includes a signal amplitude adjusting device or contrast control in the form of a potentiometer 22 having one input terminal connected to the supply means terminal 21, an adjustable output terminal 23 connected to the cathode of picture tube 15 through coupling network 24 and output terminal 25, and another input terminal 26 connected to a source of reference potential. In the description that follows, it is to be understood that the reference potential referred to is that potential corresponding to the video signal black level established at terminal 26 by the particular circuit configuration. As thus far described, contrast control 22 constitutes a conventional plate-type contrast control.

Control apparatus 14 additionally includes means, such as AGC circuit 27, responsive to the reference potential and to the video signal for stabilizing the video signal black level at input terminal 21 at the same potential as the reference potential established at terminal 26, i.e., at the same potential as the video signal black level at terminal 26. In this respect it will be seen from the drawing that contrast control 22 is connected after the point stabilized by the AGC circuit 27. The video signal supplied at terminal 21 is coupled to AGC circuit 27, specifically through resistor 28 to the control grid of triode 29, the cathode of which is connected to ground through a network comprising resistors 31 and 32 and bypass capacitor 33. The control grid of triode 29 is also connected to ground through resistor 30. Network 31, 32, 33, in conjunction with the reference or black level potential established at terminal 26, comprises part of a cathode bias network for triode 29, the other part of the network being AGC control potentiometer 34 connected to voltage supply $+V_1$ the reason for which will be made clear hereinafter.

Triode 29 is keyed into plate current conduction by flyback pulses derived from transformer 35 of the horizontal sweep output circuit of unit 18. These pulses are coupled to the plate of triode 29 through the delay circuit consisting of resistor 36, inductor 37, and capacitor 38, the delay being such that the AGC effect is derived only during the time at which the back porch portion of the video signal is present at the control grid of triode 29. The AGC signal so derived is coupled through inductor 37, resistor 36, transformer winding 35, network 39 and wire 40 to the amplifiers within unit 11 to control the gain therein so that the black level of the video signal is stabilized at terminal 21 at a potential very nearly equal to the black level potential at terminal 26.

In order for black level reproduction to be undisturbed by changes in the setting of contrast control 22, it is necessary that the potential corresponding to black be the same at both ends of the control and at all points between. With reference to the drawing, this is accomplished by making the ratio of resistors 28 and 30 and the ratio of resistors 31 and 32 equal in value. For example, if resistors 28 and 30 are chosen equal in value and resistors 31 and 32 are also chosen equal, the ratio in each case being unity, then the reference voltage at the cathode of AGC tube 29 will be one-half the voltage at terminal 26 while the voltage at the grid of tube 29 will be one-half the voltage at terminal 21. If the grid-to-cathode potential in AGC tube 29 during the back porch interval can be ignored, then the voltage at the grid of tube 29 during the back porch interval will be stabilized at a level of potential equal to the reference voltage established at the cathode of tube 29. Or, in other words, since resistor 28 equals resistor 30, AGC circuit 27 will cause the receiver gain to stabilize at that value which will cause the potential of the back porch portion of the video signal at terminal 21 to be twice the reference potential at the AGC tube cathode. Thus, during the back porch interval, the potential at terminals 21 and 26 will be essentially the same. It is to be understood, however, that if the grid-to-cathode potential in AGC tube 29 during the back porch interval cannot be ignored, then the ratio of resistances R28/R30 should not be exactly equal to, but approximately equal to, the ratio of resistances R31/R32. This is so in order to compensate for the grid-to-cathode voltage drop so that, during the back porch interval, the potential at terminals 21 and 25 will once again be essentially the same. In this manner the potential at which the video signal black level occurs at output terminal 23 of contrast control 22 will be independent of the adjustment of terminal 23, and, furthermore, will be the same as that at terminal 26. It is also to be noted that the same result could be achieved if resistors 28 and 31 were shorted and resistor 30 eliminated.

The video signal developed at terminal 23 is applied to the cathode of picture tube 15 through a novel D.-C./A.-C. coupling network 24 and output terminal 25, network 24 being more fully described in copending application Serial No. 215,964, filed August 9, 1962, and entitled "Black Level Stabilization System For A Television Receiver." Briefly, however, network 24, which includes diode 41, capacitor 42, and resistor 43, provides a D.-C. connection to the picture tube 15 over a range of low average brightness scenes while providing an A.-C. connection over a range of high average brightness scenes. In this way black level is maintained constant in the reproduced image over the subjectively important range of scene brightnesses is suppressed over the range of scene brightness where overload protection is paramount.

As described in the aforementioned application, Serial No. 215,964, when network 24 is in its D.-C. coupled mode, sufficient video amplifier plate current flows through resistor 43 to stabilize the video signal black level at the same potential at the cathode of picture tube 15 as at the plate of video amplifier 13. However, with reference to the present invention as thus far described, the video signal black level stabilized at picture tube 15 differs from that stabilized by the AGC circuit 27 at terminal 21, the degree of difference being a function of contrast control setting, i.e., a function of the adjustment of terminal 23. This results due to the loading of contrast control 22 by resistor 43 which permits video amplifier plate current to flow through the resistance between terminals 21 and 23 and through resistor 43 to ground. To compensate for the black level variations at picture tube 15 as terminal 23 is adjusted, control apparatus 14 includes a resistor 44 connected between a source of positive potential $+V_2$ and coupling network 24. With this arrangement the current necessary to stabilize the black level at picture tube 15 at the same potential as that stabilized by the AGC circuit 27 is supplied from the source $+V_2$ instead of from the plate circuit of video amplifier 13.

The potential at which the black level is to be stabilized at the output of video amplifier 13 is chosen after a consideration of the noise rejection and scanning capabilities of the television receiver. If the potential decided upon is of too low a value, the impulse noise accompanying the video signal at terminal 21 may be sufficient in magnitude to instantaneously turn off the picture tube. Although noise pulses may instantaneously turn off the picture tube even if the potential at which black is to be stabilized is of a high value, it is to be understood that by lowering that potential the probability that the picture tube will be turned off, and the frequency with which it will be turned off, will be increased thereby. On the other hand, if the potential decided upon is of too high a value, the amplitude of the synchronizing pulse portion of the video signal developed at terminal 21 may not extend its full amount but may instead be limited by voltage supply $+V_3$. The result may be improper performance of the synchronizing signal separator 16 resulting in improper scanning operation. Therefore, the potential at which black level is stabilized is normally chosen somewhere between these two limiting values. However, due to production variations in component characteristics or tolerances and to component aging this potential may vary with the passage of time, possibly to the extent of reaching a level at which the just mentioned problems due to noise or sync pulse limiting are created.

To compensate for the variations in component characteristics or tolerances associated with the production process, for component aging, and for the possible problems created thereby, control apparatus 14 additionally includes means for varying the potential at which the video signal back level is stabilized at terminal 21. Specifically, such means includes the aforementioned AGC control potentiometer 34 connected to voltage supply $+V_1$, adjustment of which varies the black level potential at terminal 26. Such adjustment, however, also causes an equal variation in the black level potential at terminal 21 due to the operation of the previously described AGC circuit 27. This follows since circuit 27 causes the potential at which the video signal black level is stabilized at terminal 21 to track the variations in potential at terminal 26. Thus, possible noise problems created by a decrease in black level potential at terminal 21 due to component aging or to variations in component characteristics or tolerances can be minimized by adjusting potentiometer 34 in a direction to increase the black level potential at terminal 26. Similarly, possible scanning problems created by an increase in the black level potential can be minimized by adjusting potentiometer 34 to decrease the black level potential at terminal 26.

However, any adjustment of potentiometer 34 to compensate for the detrimental effects caused by component aging or by variations in component characteristics or tolerances causes the video signal black level to vary at the picture tube 15. That is, for each setting of the AGC control 34, black level is stabilized at the cathode of picture tube 15 at a different potential. Therefore, control apparatus 14 finally includes means for minimizing these black level variations. Such means consists of the connection from terminal 26 to the control grid of picture tube 15 and includes wire 45, resistor 46, brightness control potentiometer 47, and resistors 48 and 49. Thus, with the arrangement as shown in the drawing, a change in potential is made to occur at the control grid of picture tube 15, to vary the bias thereon, as the potential at which the video signal black level is stabilized at terminal 21 is varied. Since these changes are in the same direction as the variations in the black level at terminal 21, the black level variations at the cathode of picture tube 15 are offset thereby improving the black level operation of the television receiver.

It is to be noted however, that if components of close tolerance are employed in the receiver, the construction of control apparatus 14 could be somewhat simplified. Specifically, there would be no need for potentiometer 34 so that it could therefore be replaced by a fixed resistor. Regardless of which construction is finally chosen however, it will be appreciated that correct black level operation will be maintained in the reproduced image independent of the setting of the contrast control 22.

While applicant does not wish to be limited to any particular set of circuit constants, the following have proved useful in control apparatus 14 in the drawing:

| | | |
|---|---|---|
| Resistor 28 | kilohms | 68 |
| Resistor 30 | do | 68 |
| Resistor 31 | do | 15 |
| Resistor 32 | do | 15 |
| Resistor 36 | do | 10 |
| Resistor 43 | do | 330 |
| Resistor 44 | do | 160 |
| Resistor 46 | do | 220 |
| Resistor 48 | do | 27 |
| Resistor 49 | do | 680 |
| Contrast control potentiometer 22 | do | 30 |
| AGC control potentiometer 34 | do | 20 |
| Brightness control potentiometer 47 | do | 220 |
| Capacitor 33 | microfarads | 5 |
| Capacitor 38 | picofarads | 235 |
| Capacitor 42 | microfarad | 0.22 |
| Inductor 37 | millihenries | 52 |
| Diode 41 | | 1N34A |
| AGC tube 29, (triode connected) | | ½6KA8 |
| Voltage supply $+V_1$ | volts | 270 |
| Voltage supply $+V_2$ | do | 270 |
| Voltage supply $+V_3$ | do | 270 |
| Voltage supply $+V_4$ | do | 270 |

While there has been described what is at present considered to be the preferred embodiment of this invention, it will be obvious to those skilled in the art that various changes and modifications may be made therein without departing from the invention and it is therefore, aimed to cover all such changes and modifications as fall within the true spirit and scope of the invention.

What is claimed is:

1. Apparatus for controlling the video signal of a television receiver having an image-reproducing device comprising:

first means for supplying a video signal having a level intended to correspond to black in the reproduced image;

second means for supplying an adjustable reference potential;

contrast control means for adjusting the amplitude of said video signal, having a first terminal coupled to said first means, a second terminal coupled to said second means, and a third terminal adjustably coupled to said first and second terminals and coupled to said image-reproducing device;

and automatic control means coupled to said first and second terminals for stabilizing black level in the video signal supplied to said first terminal at the potential supplied to said second terminal for causing the video signal black level translated, via said third terminal, to said image-reproducing device to be stabilized at said second terminal potential independently of adjustments in the contrast of said translated signal.

2. Apparatus as described in claim 1, wherein said image-reproducing device is a cathode-ray tube, said translated video signal is coupled to a cathode of said tube, and said second terminal is coupled to a control grid of said tube to provide a bias which varies in accordance with variations in said reference potential to minimize black level variations in the reproduced image.

3. Apparatus as described in claim 2, wherein said contrast control is a potentiometer, said first terminal and said second terminal have a resistance coupled therebetween and said third terminal is adjustably coupled to said resistance.

4. Apparatus for controlling the video signal of a television receiver having a cathode-ray tube comprising:

first means for supplying a video signal having a level intended to correspond to black in the reproduced image;

second means for supplying a reference potential which is adjustable to compensate for undesired variations in circuit parameters;

a contrast control potentiometer for adjusting the amplitude of said video signal, having a first terminal coupled to said first means, a second terminal coupled to said second means, a resistance coupled between said first and second terminals, and an output terminal adjustably coupled to said resistance and coupled to a cathode of said cathode-ray tube;

and a keyed automatic-gain-control circuit responsive to said reference potential and to said supplied video signal for tracking changes in said reference potential at said second terminal to stabilize the black level of the supplied video signal at the first terminal at the same potential appearing at said second terminal for causing the video signal black level at said output terminal to be stabilized at said reference potential regardless of adjustments in the amplitude of said video signal.

5. Apparatus as described in claim 4, in which is additionally included means for coupling said reference potential to a control grid of said cathode-ray tube to provide a bias which varies in accordance with variations in said reference potential to minimize black level variations in the reproduced image.

References Cited by the Examiner

UNITED STATES PATENTS

| | | | |
|---|---|---|---|
| 3,051,780 | 8/1962 | Trost | 178—7.5 |
| 3,201,513 | 8/1965 | Schreiner | 178—7.5 |

DAVID G. REDINBAUGH, *Primary Examiner.*

J. McHUGH, R. L. RICHARDSON, *Assistant Examiners.*